BEAT FREQUENCY SIGNAL GENERATOR

Filed April 30, 1964

INVENTOR
GÜNTHER HOFFMANN
BY Toulmin & Toulmin
ATTORNEYS

United States Patent Office 3,249,888
Patented May 3, 1966

3,249,888
BEAT FREQUENCY SIGNAL GENERATOR

Günther Hoffmann, Eningen unter Achalm, Germany, assignor to Wandel u. Goltermann, Postfach, Germany Filed Apr. 30, 1964, Ser. No. 363,860
Claims priority, application Germany, May 4, 1963, W 34,416
4 Claims. (Cl. 331—38)

The invention relates to a high-frequency signal generator for measuring purposes in which the measuring frequency is formed by the superimposition of two frequencies, of which one is fixed or only slightly variable and the other is variable over a larger range. Such signal generators are required more especially in measuring setups (for example level or sweep measuring setups) in the carrier frequency technique or in the telecommunications art.

If the measuring frequency in known signal generators of this type is to pass over a relatively large frequency range, various frequency-determining elements corresponding to the component ranges must be provided, which have to be changed over in each instance. In this case, a number of scales are generally present—one for each component range—whereby the reading of the frequency adjustment is rendered difficult, which may easily result in reading errors.

In addition, beat-frequency generators are known which embrace a large frequency range with a single scale without range change-over in order to afford maximum ease of operation and to avoid the aforesaid reading errors. Since in such cases the two generators employed operate at relatively high frequencies and the uncertainty of the measuring frequency is determined directly by the sum of the frequency fluctuations of these generators, this uncertainty is relatively great at low frequencies.

A beat-frequency transmitter in which one generator supplies a constant frequency and a second generator is detunable in a wide frequency range, and both frequencies are applied to a mixer and to a low-pass filter connected thereto, in order to form the difference frequency, is not attended by the disadvantages of known arrangements because the frequency of the two generators is subdivided on a single or multiple digital basis, more especially on a decimal basis or a binary basis, the divided frequencies are in each case applied in known manner to a mixer and to a low-pass filter for the formation of the difference, and either one of the two difference frequencies is employed as the sending frequency according to choice.

It is an object of this invention to provide a signal generator which is distinguished by high accuracy of the sending frequency at relatively low frequencies.

It is another object of this invention to simplify the fine adjustment and reading of measuring frequencies by providing a single scale for all the ranges.

It is another object of this invention to provide a signal generator using frequency ranges which differ by the division factors, particularly by the factors 10, 100 . . .

Figure 1:
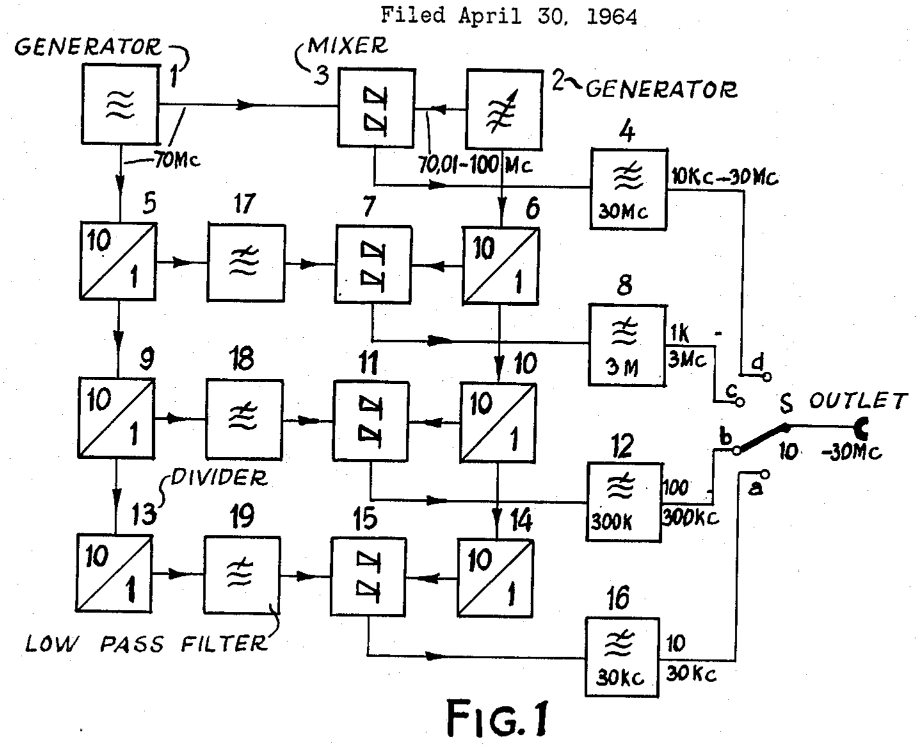

The invention will be more fully explained with reference to the drawings. FIGURE 1 illustrates the block circuit diagram of a beat-frequency transmitter according to the invention having a frequency range of, for example, 10 c./s. to 30 mc./s. The generator 1 supplies to the modulator 3 a constant frequency of 70 mc./s. The generator 2 is variable between 70.01 and 100 mc./s. There is then available at the output of the low-pass filter and thus at the output of the transmitter, when the switch S is in the position *d*, a measuring frequency between 10 c./s. and 30 mc./s. When the switch S is in the position *c*, there may be derived from the output of the transmitter, measuring frequencies from 1 kc./s. to 3 mc./s., since the frequencies of the generator 1 (70 mc./s.) and of the generator 2 (70.01 to 100 mc./s.) are divided in the ratio 10:1, are then applied to a modulator 7 and pass through a low-pass filter 8 to the contact *c* of the switch S. In the same way, the ranges 100 c./s. to 300 kc./s. and 10 c./s. to 30 kc./s. are created by further division (frequency dividers 9 and 10, and 13 and 14) and modulation (modulators 11 and 15). The low-pass filters 12 and 16 serve for the same purpose as the low-pass filters 4 and 8. The harmonics of the square-wave signals formed in the frequency division are filtered out in the low-pass or band-pass filters (17, 18, 19), so that the mixers (7, 11, 15) receive sinusoidal marking signals. The carrier voltages of the mixers may remain in square-wave form, and sinusoidal signals having very low non-linear distortion are nevertheless obtained at the output of the low-pass filters (8, 12, 16).

As stated in the foregoing, the uncertainty of the measuring frequency is determined directly by the sum of the frequency fluctuations of the generators 1 and 2. By the multiple division of the frequencies of these generators down to relatively low frequencies, the frequency fluctuations are also correspondingly divided, and consequently the uncertainty of the measuring frequency at these low frequencies is relatively small.

Since all the ranges differ exactly by the factor 10 in the arrangement according to FIGURE 1, a single frequency scale is sufficient, whereby the adjustment and reading of a desired sending frequency is rendered very convenient. If it is necessary for any reason, a frequency division in another ratio (for example 5:1) may naturally be effected.

If a fine adjustment is desired in the individual ranges in addition to the coarse adjustment by means of the generator 1, the latter may be adapted to be detuned, for example, from 70 to 69 mc./s. The measuring frequency can then be finely detuned by 1 mc./s. when the switch is in the position *d*, by 100 kc./s. in the position *c*, by 10 kc./s. in the position *b* and by 1 kc./s. in the position *a*. This differing fine detuning in the individual (overlapping) frequency ranges has the advantage that a more convenient testing of four-terminal networks of any kind which possess the same central frequency but have differing band widths, is possible. If, for example, two specimens are each to be tested with a central frequency of 2 mc./s., and if one has a large band width and the other a relatively small band width, the position *d* of the switch S will be chosen for the wide-band specimen and the position *c* will be chosen for the narrow-band specimen, since in the first case a fine tuning of 1 mc./s. is possible, and in the second case one of 100 kc./s.

Figure 2:
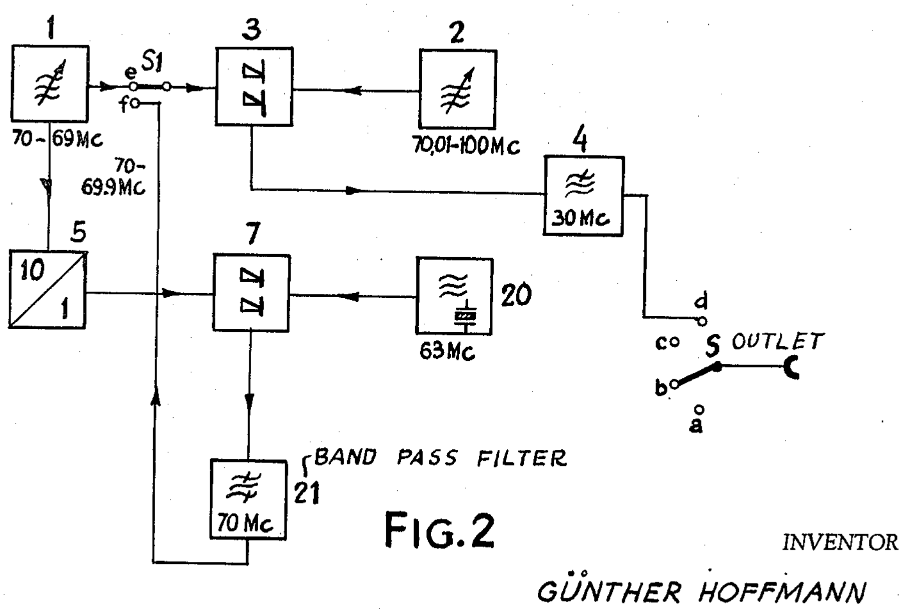

If a differing fine tuning is to exist within a partial range (for example 10 kc./s. to 30 mc./s.), this may be effected with an arrangement according to FIGURE 2. (For circuit units identical with those in FIGURE 1, the same references have been chosen.) If the switch $S_1$ is in the position *e*, the measuring frequency may be accurately adjusted from 10 kc./s. to 30 mc./s. as in FIGURE 1, and a fine tuning by 1 mc./s. is possible by tuning of the generator 1. When the switch $S_1$ is in the position *f*, on the other hand, the measuring frequency (10 kc./s. to 30 mc./s.) may be finely tuned by 100 kc./s., since the frequency of the generator 1 passes through the divider 5 to the modulator 7, to the second input of which there is connected a quartz oscillator 20 (63 mc./s.), and the difference frequency (69.9 to 70 mc./s.) is present at the contact *f* of the switch $S_1$ after the band-pass filter 21 has been passed. With the arrangement described here, an even simpler testing of specimens of like central frequency but differing band widths is possible, because in this case the (coarse) frequency range need not be changed.

If the generator 1 is constructed for wobbling, then the wobble swing can be simply adjusted by changing-over the switch $S_1$, which is advantageous in many testing operations.

For the sake of clarity, the fine detuning has been drawn only for one frequency range in FIGURE 2, but it may also be effected in further ranges or in all ranges.

It will be understood that the invention is not limited to the embodiments described above but all changes and modifications thereof not constituting departures from the spirit and scope of the inventions are intended to be covered by the following claims.

I claim:

1. In a signal generator comprising a first generator, said first generator supplying a constant frequency, a second generator, said second generator being tunable in a wide frequency range, first mixing means, said first mixing means forming a difference frequency from the frequency of the first generator and the frequency of the second generator, and a first lowpass filter connected to said mixing means, the combination comprising a plurality of frequency dividers wherein the frequency of the first generator and the frequency of the second generator are divided, second mixing means being connected to said frequency dividers, and second low-pass filters being connected to said second mixing means, said second mixing means forming a difference frequency of said divided frequencies and applying said difference frequencies to said second low-pass filters, whereby one of said difference frequencies is employed as signal frequency.

2. In a signal generator comprising a first generator, said first generator supplying a constant frequency, a second generator, said second generator being tunable in a wide frequency range, first mixing means, said first mixing means forming a difference frequency from the frequency of the first generator and the frequency of the second generator, and a first low-pass filter connected to said mixing means, the combination comprising a plurality of frequency dividers wherein the frequency of the first generator and the frequency of the second generator are divided on a decimal basis, second mixing means being connected to said frequency dividers, and second low-pass filters being connected to said second mixing means, said second mixing means forming a difference frequency of said divided frequencies and applying said difference frequencies to said second low-pass filters, whereby one of said difference frequencies is employed as signal frequency.

3. In a signal generator comprising a first generator, said first generator supplying a constant frequency, a second generator, said second generator being tunable in a wide frequency range, first mixing means, said first mixing means forming a difference frequency from the frequency of the first generator and the frequency of the second generator, and a first low-pass filter connected to said mixing means, the combination comprising a plurality of frequency dividers wherein the frequency of the first generator and the frequency of the second generator are divided on a binary basis, second mixing means being connected to said frequency dividers, and second low-pass filters being connected to said second mixing means, said second mixing means forming a difference frequency of said divided frequencies and applying said difference frequencies to said second low-pass filters, whereby one of said difference frequencies is employed as signal frequency.

4. In a signal generator comprising a first generator, said first generator supplying a frequency which is tunable over a small frequency range, a second generator, said second generator being tunable in a wide frequency range, a third generator, said third generator supplying a fixed frequency, first mixing means, said first mixing means forming a difference frequency from the frequency of the first generator and the frequency of the second generator, a first low-pass filter connected to said mixing means, and a switch for selecting the signal for one input of said mixing means, the combination comprising a frequency divider wherein the frequency of the first generator is divided, second mixing means being connected to said frequency divider and to said third generator, and a band-pass filter being connected to said second mixing means, the latter forming a difference frequency of said divided frequency and the frequency of said third generator and applying said difference frequency to said band-pass filter, the output of said band-pass filter being connected with said switch which selects either the output of one of said first and second generator or the output from the band-pass filter for application to one of the inputs of the mixers.

No references cited.

ROY LAKE, *Primary Examiner.*

JOHN KOMINSKI, *Examiner.*